Patented Feb. 23, 1932

1,846,637

UNITED STATES PATENT OFFICE

LEO FLEISCHMAN, OF NEW YORK, N. Y.

CEMENT FOR FLOOR COVERINGS

No Drawing.    Application filed June 24, 1927. Serial No. 201,280.

This invention relates to cementitious compositions and more particularly to an adhesive composition for floor covering material like cork, linoleum, and similar materials.

Heretofore it was customary in covering floors with material such as cork tiles or sheet or tile linoleum, to use an adhesive in order to bind such material to the floor. These adhesives may be divided roughly into two classes, to wit, waterproof and non-waterproof cements. The non-waterproof type is usually composed of dextrine, glue, sodium silicate, or similar compounds dissolved in water, to which a mineral filler may or may not be added. A cement of this non-waterproof kind can only be used where it is protected against moisture and water. This protection, as will be pointed out more fully hereinafter, is usually given to the non-waterproof cement by surrounding the exposed edges thereof by a waterproof cement. The latter cement usually is composed of a waterproof gum or resin, like shellac, copal, etc. dissolved in an organic solvent such as alcohol or the like. To this solution an inert filler, say silica, is added merely to give body to the cement.

In covering floors with linoleum or cork, the flooring material is usually laid as tiles, although, especially in the case of linoleum, it may also be laid in sheet form. In the case of tiles they are generally bonded to the floor by a waterproof adhesive while in the case of sheet material such material is generally bonded by a non-waterproof cement or adhesive which is surrounded at the edges and protected at the seams by a waterproof cement. In this manner the non-waterproof cement was protected to a certain degree against moisture or water which might enter through the seams of the floor-covering material. One of the reasons for not using the waterproof cement for bonding sheet material to the floor is that if the waterproof cement is used the rapid evaporation of the organic solvent causes gas to form which raises a portion of the sheet from the floor. This effect is not noticeable when tiles are used as the tiles are relatively small units and the rapid evaporation of the solvent is effected through the many seams. Consequently in laying tiles a waterproof cement becomes possible.

After the floors thus covered have been in use for a period of time, many failures of the floor covering materials have occurred. The material as the result of the disintegration or decomposition of the cement often becomes loose at the ends and at intermediate points and tends to curl up away from the floor. These failures it was noted, were particularly frequent in cases where the floor covering material was laid directly on fresh concrete, i. e. on concrete which was still "green", or still contained a considerable percentage of the orginal moisture, as is the common case of new buildings. Failures of this kind were as a rule attributed to a fancied defect in the cement used to bond the cork or linoleum to the concrete or in its composition, but on careful investigation of the causes I discovered that the true cause of these failures is primarily due to disintegration which is the result of a saponification of the gums or resins (copal, shellac, etc.) by alkaline solutions such as are formed by the free alkali existing in freshly laid concrete or alkaline cleansing agents such as are mainly used for scrubbing and which have penetrated to the cement through the open seams or parted edges of the tiles. This discovery also explains the failures which occurred where the floor covering material was laid on wooden floors, since in this case too, the alkaline solution produced by common cleansing mediums such as strong soaps, alkaline powders, etc., had an opportunity of reaching the cement substances and of effecting saponification and ultimately disintegration. The washing or scrubbing solution readily filters through the seams and pores of the floor covering material, whereby the action of saponification and deterioration of the bonding cement is accelerated.

Based upon these observations I sought for an adhesive material which would resist the action of alkaline solutions and which would withstand the deterioration and destruction due to operating conditions and preserve a powerful adhesive condition. I did not, however, find in any of the materials or compositions suggested by others any cementing material which would satisfactorily fulfill my conditions. I was therefore compelled to begin with fundamentals and to compose a cement in accordance with my own ideas. To this end I selected for my non-saponifiable agent a material known as para coumarone resin which is a mixture of para coumarone, para indene and polymers of other hydrocarbons found in coal tar. This material will not in itself act as a satisfactory adhesive or cement, but it is waterproof and non-saponifiable and is substantially inert to the action of alkalis and other corrosives, and therefore partially fills my requirements. A coumarone resin of relatively high melting point will, in association with a proper solvent, as will be explained further on, not only give a firm final set but will give sufficient strength during the setting period to resist the curling action of the tiles.

The next ingredient which I required was a substance which imparts spreading and body giving qualities to the cement. Wood flour was found to be unsatisfactory for my purposes. To satisfy my requirements, the foundation agent commonly called a filler, must have structural strength and be one which does not readily settle out of the final mixture and which permits relatively free evaporation of solvents, while being capable of uniting or co-operating with the resin to form a solid, strong body or mass of material possessing in the conjoint state, physical properties such as covering power, ease of spread, smoothness, and other similar attributes. When wood flour was used, it apparently absorbed the solvent to a degree which interfered with the proper setting of the cement and the solidification thereof. In casting about for a proper filler to suit my purposes, I found in magnesium silicate, particularly that form thereof known on the market as asbestine, a material which seemed to satisfy all my conditions. Apparently other fillers and substances such as whiting, talc, clay, soapstone, and materials having similar properties, can be successfully used with para coumarone resins, and their solvents, but the preferred material is as stated, asbestine.

I still required a solvent and, for this purpose, after numerous experiments, selected commercial benzol, say 90%, as the preferred solvent for the resin. One of the reasons for selecting benzol was that it volatilizes with sufficient rapidity to permit the cement to grip the tile before it tends to curl. A solution which does not evaporate with sufficient rapidity affords an opportunity for the tiles to curl (as any flat material will tend to do when one of its surfaces is wetted) before the required strength of bond has been reached. As a general rule, the solvent should remain in the cement during the spreading upon the floor and during the laying of the floor coverings, i. e. the cement should not film, but should remain sticky until the floor covering is laid. The time varies, of course, depending upon the specific components and the consistency of the cement, the size and kind of floor covering, and other pertinent factors. Usually, the sticky period of the cement may vary from about 5 to about 30 minutes with a preferred average period of about ten minutes. After this period of time, herein termed the working period, the cement should set as rapidly as possible to form a permanent and durable bond.

By dissolving para coumarone resin in benzol and then incorporating the clay, I found that I had a material which possesses all the necessary physical properties of a cement such as I wanted, and in addition, the chemically resistant properties for which I strove. A cement thus made spreads easily and smoothly and when the floor is laid, offers the proper resistance against over-rapid evaporation of the solvent. The cement, once it has set, as well as during the process of setting, possesses the requisite strength and tenacity and retains the capacity of supplying a firm and enduring bond resistant against corrosive and deteriorating agents and environments.

Generally speaking, therefore, my invention finds its embodiment in the preparation of a cement by dissolving an inert non-saponifiable resin of the para coumarone type in a solvent which evaporates relatively fast, and which possesses satisfactory solubility properties for the resins especially in the presence of a foundation agent and which gives a mixture of proper consistency for working.

In order to describe the invention more particularly, the following illustrative examples are given, although it is to be understood that the invention is not limited to these examples.

The para coumarone resin used in these examples is the substance which can be bought on the market under the trade name "cumar". The para coumarone resins having higher melting or softening points are preferred. The following composition has been found to be very efficacious and, hence, may be considered to be a preferred example.

| | Parts by weight |
|---|---|
| Cumar (melting point about 95°–127° C.) | 30 |
| Benzol | 15 |
| Mineral silicate | 55 |

Other examples are as follows:—

| | | Parts by weight |
|---|---|---|
| Example 1. | Cumar (melting point 95°–127° C.) | 31 |
| | Benzol | 12½ |
| | Carbon tetrachloride | 2½ |
| | Mineral silicate | 54 |

| | | Parts by weight |
|---|---|---|
| Example 2. | Cumar (melting point 95°–127° C.) | 31 |
| | Benzol | 7½ |
| | Petroleum naphtha | 7½ |
| | Whiting | 27 |
| | Mineral silicate | 27 |

| Example 3. | | Parts by weight |
|---|---|---|
| | Cumar (melting point 95°–127° C.) | 31 |
| | Benzol | 15 |
| | Silica and whiting each | 27 |

| Example 4. | | Parts by weight |
|---|---|---|
| | Cumar (melting point 95°–127° C.) | 31 |
| | Benzol | 15 |
| | Silica | 54 |

It is to be noted that solvents other than those mentioned in the typical examples may be used in my improved cements. For example, I may use petroleum solvents in general, toluol and other solvents of the coal tar group, carbon tetrachloride, members of the turpentine group, and other solvents which can dissolve the resins or the like, and which at the same time are compatible with the foundation and structural agent employed in the mixture, i. e. which will not cause the filler or foundation agent to settle, which will not unduly adhere to the surface of the particles constituting the filler and thereby impede free evaporation, which will not tend to be absorbed, adsorbed, or occluded in the filler or in the floor covering, which will not corrode the filler, and which will not be stimulated by the filler to cause occurrence of the "skinning effect" hereinabove referred to. Preferably, however, I use benzol.

Further examples are as follows:—

| Example 5. | | Parts by weight |
|---|---|---|
| | Carbon tetrachloride | 3⅓ |
| | Cumar | 6½ |
| | Kaolin | 6 |

| Example 6. | | Parts by weight |
|---|---|---|
| | Ethyl acetate | 3⅓ |
| | Cumar | 6½ |
| | Fuller's earth | 3 |

| Example 7. | | Parts by weight |
|---|---|---|
| | Toluol | 3⅓ |
| | Cumar | 6½ |
| | Talc | 16 |

| Example 8. | | Parts by weight |
|---|---|---|
| | Benzol | 6⅔ |
| | Cumar | 6½ |
| | Bentonite | 20 |

| Example 9. | | Parts by weight |
|---|---|---|
| | Xylol | 8 |
| | Cumar | 6 |
| | Bentonite | 20 |

| Example 10. | | Parts by weight |
|---|---|---|
| | High-flash naphtha | 1–2 |
| | Cumar | 6–7 |
| | China clay | 3–4 |

| Example 11. | | Parts by weight |
|---|---|---|
| | Benzol | 3 |
| | Cumar | 6 |
| | Clay | 11 |

In the determination of suitable solvents, I have also found that solvents which evaporate too quickly tend to cause the occurrence of the so-called "skinning effect". The term "skinning effect" denotes the property in cements of quickly forming a film or skin upon the surface of the cement when it is spread on the floor and this film or skin is the result of surface-evaporation of the solvent. When the skinning effect is accentuated the thorough setting of the whole under surface of the tile is obstructed, and, thus, the bonding of the floor covering material to the floor is interfered with. It is prudent, therefore, in many instances to use blended or compounded solvents which will have the least "skinning effect" and at the same time which will have the quickest drying time consistent with proper setting. The foundation and structural agent apparently has a certain influence on the intensity or degree of the "skinning effect" which must be taken into consideration in addition to the characteristics heretofore mentioned when choosing such an agent.

A typical method for the manufacture of the new cement may be set forth as follows: 3100 pounds of cumar are dissolved in a mixture of 750 pounds of naphtha and 750 pounds benzol in a kettle provided with a steam jacket or steam coil. By passing steam into the jacket or coil and thus heating the mixture in the kettle the solution of the coal tar resin in the solvent is aided and facilitated. During the entire operation the mixture is constantly stirred and agitated. After the solution is complete about 5400 pounds of asbestine are stirred in and the mixture is agitated until a substantially uniform composition has been attained. The hot mass in the kettle is then allowed to cool by itself or is cooled positively by circulating cooling water or the like through the jacket or coils. When the mixture is cold it is poured into suitable containers such as drums. This product has a good flow but not too fluid, spreads easily when worked, and does not dry before a permanent bond has been established between the floor foundation and the floor covering material.

The method of using my improved cement will be obvious to those skilled in the art. The cement is spread evenly upon the floor with a trowel or similar tool so as to produce a strong bed of binding material, usually about one-sixteenth to about one-quarter of an inch in thickness. The resin is present in my cement in sufficient quantity to give a satisfactory adhesiveness thereto and not sufficient to prevent the proper spreading thereof. After a proper bed of cement is applied to the floor, the floor covering is laid. The solvent which is relatively volatile evaporates relatively freely from the cement and at such a rate that the cement sets satisfactorily and binds the floor covering tenaciously to the floor.

By having the solvent compatible with the foundation agent (preferably one of mineral character) as explained hereinabove, the evaporation of the solvent is unimpeded and the setting of the cement is facilitated. After the cement has set it is substantially inert to the influence of alkaline materials and is practically non-saponifiable. A floor covering united to a floor with my improved cement is unaffected by the usual washing with alkaline cleansing powders and the like, and is protected against the usual failures noted heretofore.

It will be observed that although certain specific materials and proportions were heretofore set forth the invention is not necessarily limited thereto, but includes other proportions and other materials having similar properties and characteristics.

I claim:

1. A cement for floor coverings which consists of about 30 parts of a high melting point para coumarone resin, about 15 parts of benzol, and approximately 55 parts of clay.

2. A waterproof cement for uniting covering material with a surface to be covered which comprises approximately one part by weight, of a para coumarone resin, approximately ¼ to 2 parts, by weight, of an organic solvent for said resin having the property of evaporating at normal atmospheric temperatures, and approximately ½ to 4 parts by weight, of a mineral filler possessing smooth and non-settling characteristics incorporated with said resin and said solvent, said filler giving the cement such a stable consistency as to adapt the cement to be readily spread over a surface to which it is applied and to permit substantially complete evaporation of the solvent within the working period of spreading the said cement.

3. A waterproof cement for uniting covering material with a surface to be covered which comprises approximately one part, by weight, of a high melting point para coumarone resin, approximately ¼ to 2 parts, by weight, of an aromatic solvent for said resin having the property of evaporating at normal atmospheric temperatures, and approximately ½ to 4 parts by weight, of a silicate filler possessing smooth and non-settling characteristics incorporated with said resin and said solvent, said filler giving the cement such a stable consistency as to adapt the cement to be readily spread over a surface to which it is applied and to permit substantially complete evaporation of the solvent within the working period of spreading the said cement.

In testimony whereof I have hereunto set my hand.

LEO FLEISCHMAN.